(12) United States Patent
Sasakura

(10) Patent No.: US 10,399,607 B2
(45) Date of Patent: Sep. 3, 2019

(54) VEHICLE FLOOR STRUCTURE

(71) Applicant: Toyota Jidosha Kabushiki Kaisha, Toyota-shi, Aichi-ken (JP)

(72) Inventor: Yuki Sasakura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/873,437

(22) Filed: Jan. 17, 2018

(65) Prior Publication Data

US 2018/0208250 A1    Jul. 26, 2018

(30) Foreign Application Priority Data

Jan. 24, 2017   (JP) ................. 2017-010258

(51) Int. Cl.
  *B62D 25/20* (2006.01)
  *B62D 27/02* (2006.01)

(52) U.S. Cl.
  CPC ......... *B62D 25/2018* (2013.01); *B62D 27/02* (2013.01)

(58) Field of Classification Search
  CPC .............. B62D 25/20; B62D 25/2018; B62D 25/2045; B62D 27/02
  USPC ................. 296/187.08, 193.07, 204
  See application file for complete search history.

(56) References Cited

U.S. PATENT DOCUMENTS

| | | | | |
|---|---|---|---|---|
| 6,688,676 | B1 * | 2/2004 | Sato | B62D 21/152 |
| | | | | 296/187.05 |
| 9,896,131 | B2 * | 2/2018 | Onishi | B62D 21/157 |
| 2013/0038090 | A1 * | 2/2013 | Hwang | B62D 25/20 |
| | | | | 296/193.07 |
| 2015/0145284 | A1 * | 5/2015 | Nishida | B62D 25/2036 |
| | | | | 296/187.1 |
| 2016/0052561 | A1 * | 2/2016 | Atsumi | B62D 25/2045 |
| | | | | 296/187.08 |
| 2017/0001669 | A1 * | 1/2017 | Ohigashi | B62D 25/088 |
| 2017/0217494 | A1 * | 8/2017 | Kim | B62D 21/15 |
| 2018/0065676 | A1 * | 3/2018 | Yoshida | B62D 25/20 |
| 2018/0208250 | A1 * | 7/2018 | Sasakura | B62D 25/2018 |
| 2019/0009833 | A1 * | 1/2019 | Yamagishi | B62D 27/02 |

FOREIGN PATENT DOCUMENTS

| | | |
|---|---|---|
| JP | 62-198184 U | 12/1987 |
| JP | 63-148583 U | 9/1988 |
| JP | 0769246 A | 3/1995 |
| JP | 2007-320341 A | 12/2007 |
| WO | 2014/162493 A1 | 10/2014 |

* cited by examiner

*Primary Examiner* — Gregory A Blankenship
(74) *Attorney, Agent, or Firm* — Dinsmore & Shohl LLP

(57) ABSTRACT

A vehicle floor structure includes: a floor tunnel extending in a vehicle-longitudinal direction at a center in a vehicle-width direction of a vehicle; and a floor pan fixed outward of the floor tunnel in the vehicle-width direction. The floor tunnel includes a top wall having a plate-like shape, a side wall extending downward from an edge of the top wall in the vehicle-width direction toward the floor pan, a tunnel reinforcement covering a corner ranging from the edge to an upper edge of the side wall in the vehicle-upward direction, and a reinforcement member provided on the side wall. A part of the reinforcement member is placed on an outer surface of the tunnel reinforcement, and is fixed to the outer surface of the tunnel reinforcement at a position adjacent to a front end of the floor tunnel.

5 Claims, 2 Drawing Sheets

VEHICLE FLOOR STRUCTURE

CROSS-REFERENCE TO RELATED APPLICATIONS

This application claims priority to Japanese Patent Application No. 2017-010258 filed on Jan. 24, 2017, which is incorporated herein by reference in its entirety including the specification, drawings and abstract.

BACKGROUND

1. Technical Field

The present disclosure relates to a vehicle floor structure.

2. Description of Related Art

In a vehicle flow structure described in Japanese Utility Model Application No. 62-198184 (JP 62498184 U), a floor panel is constituted by a floor tunnel extending in the vehicle-longitudinal direction at the center in the vehicle-width direction, and floor pans located outward in the vehicle-width direction of the floor tunnel. The floor tunnel includes a top wall, and a pair of side walls extending downward from respective outer edges in the vehicle-width direction of the top wall to the floor pans. The floor tunnel is further provided with tunnel reinforcements, each of which is fixed to an outer surface of a corner ranging from each outer edge in the vehicle-width direction of the top wall to an upper edge of each side wall.

SUMMARY

In the vehicle floor structure described in JP 62-198184 U, a power unit generating driving force of the vehicle, such as an internal combustion engine and a drive motor, is disposed at a more frontward position than the floor tunnel. When an object collides against the vehicle from the front side and the power unit moves rearward, a great load acts on the floor tunnel. Hence, it might be difficult to sufficiently suppress deformation of the floor tunnel only by reinforcing the floor tunnel using the tunnel reinforcements. Therefore, there is room for further improvement in suppression of deformation of the floor tunnel against a load from the vehicle front side.

An aspect of the present disclosure provides a vehicle floor structure. A vehicle floor structure according to the aspect of the disclosure includes: a floor tunnel extending in a vehicle-longitudinal direction at a center in a vehicle-width direction of a vehicle; and a floor pan fixed outward of the floor tunnel in the vehicle-width direction. The floor tunnel includes a top wall having a plate-like shape, a first side wall extending downward from a first edge of the top wall in the vehicle-width direction toward the floor pan, a tunnel reinforcement covering a corner ranging from the first edge to an upper edge of the first side wall in a vehicle-upward direction, and a reinforcement member provided on the first side wall. A part of the reinforcement member is placed on an outer surface of the tunnel reinforcement, and is fixed to the outer surface of the tunnel reinforcement at a position adjacent to a front end in the vehicle longitudinal direction of the floor tunnel.

The vehicle floor structure according to the aspect may include a dash lower cross member provided on upper surface of the floor pan, the dash lower cross member extending in the vehicle-width direction along a front edge of the floor pan. An inner end portion of the dash lower cross member in the vehicle-width direction may be connected to the first side wall. The reinforcement member may be disposed on the first side wall at a position above a position of the first side wall to which the dash lower cross member is connected.

In the above configuration, when an object collides against the vehicle from the front side and the power unit moves rearward, a load due to the collision acts on the floor tunnel from the vehicle front side. In addition, part of the load from the vehicle front side is received by the dash lower cross members. Since the dash lower cross members are connected to the side walls of the floor funnel, part of the load received by the dash lower cross members also acts on the side walls of the floor tunnel. That is, when a load is applied from the front side, a great stress is applied to the parts on the vehicle front side of the side walls of the floor tunnel. In addition, a part of each side wall of the floor tunnel, the part being located above the dash lower cross member and lower than the tunnel reinforcement, is easily deformed because the part is not reinforced by the tunnel reinforcement. In the above configuration, the reinforcement member is fixed to the part of the side wall, the part being located above the part to which the dash lower cross member is connected. Hence, an easily deformable part of the floor tunnel can be properly reinforced.

In addition, in the above configuration, the reinforcement member is placed on the outer surface of the tunnel reinforcement, and is also fixed to the outer surface of the tunnel reinforcement. Hence, when a load is applied to the floor tunnel from the front side, the reinforcement member can suppress that the front end portion of the reinforcement member is separated in such a manner as to peel up from the outer surface of the side wall. Accordingly, it is possible to securely exert the reinforcing effect expected for the reinforcement member of the floor tunnel. As a result, according to the above configuration, compared with a configuration that employs no reinforcement member, it is possible to more properly reduce deformation of the floor tunnel against a load from the vehicle front side.

In the above aspect, a rear end portion of the reinforcement member in the vehicle-longitudinal direction may be fixed to the outer surface of the tunnel reinforcement.

In the above configuration, when a load acts on the reinforcement member from the front side, the load can be transmitted to the tunnel reinforcement via the rear end portion of the reinforcement member. In this manner, the load transmitted to the floor tunnel via the reinforcement member is allowed to act on the part of the floor tunnel to which the tunnel reinforcement having a relatively high strength in the floor tunnel is fixed, to thereby suppress occurrence of deformation in the floor tunnel.

In the above aspect, the floor tunnel may include a second side wall extending downward from a second edge of the top wall. The second edge may be on the other side of the first edge in the vehicle width direction. A power unit generating driving force of the vehicle may be located more frontward in the vehicle-longitudinal direction than the floor tunnel, and may be disposed such that a center of the power unit is closer to the first edge of the top wall than to the second edge. A reinforcement member may not be provided on an opposite side of the center of the floor tunnel in the vehicle-width direction from the reinforcement member.

As the above configuration, when the power unit is disposed closer to either side in the vehicle-width direction, a greater load is likely to be applied to the side in the vehicle-width direction of the floor tunnel. According to the above configuration, since the reinforcement member is fixed on the side where the power unit is disposed closer, it is possible to properly reduce deformation of the floor tunnel even when a great load is applied. On the other hand, no reinforcement member is fixed on an opposite side to the side where the power unit is disposed closer. Accordingly, it is possible to minimize increase in number of components and increase in weight, or complication of the manufacturing process by employing the reinforcement member.

In the above aspect, the floor tunnel may include a front region ranging from a predetermined part of the floor tunnel in the vehicle-longitudinal direction to the front end, in the front region, the top wall is located more upward as the top wall extend frontward in the vehicle-longitudinal direction, and the reinforcement member may be fixed to the first side wall within the front region.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
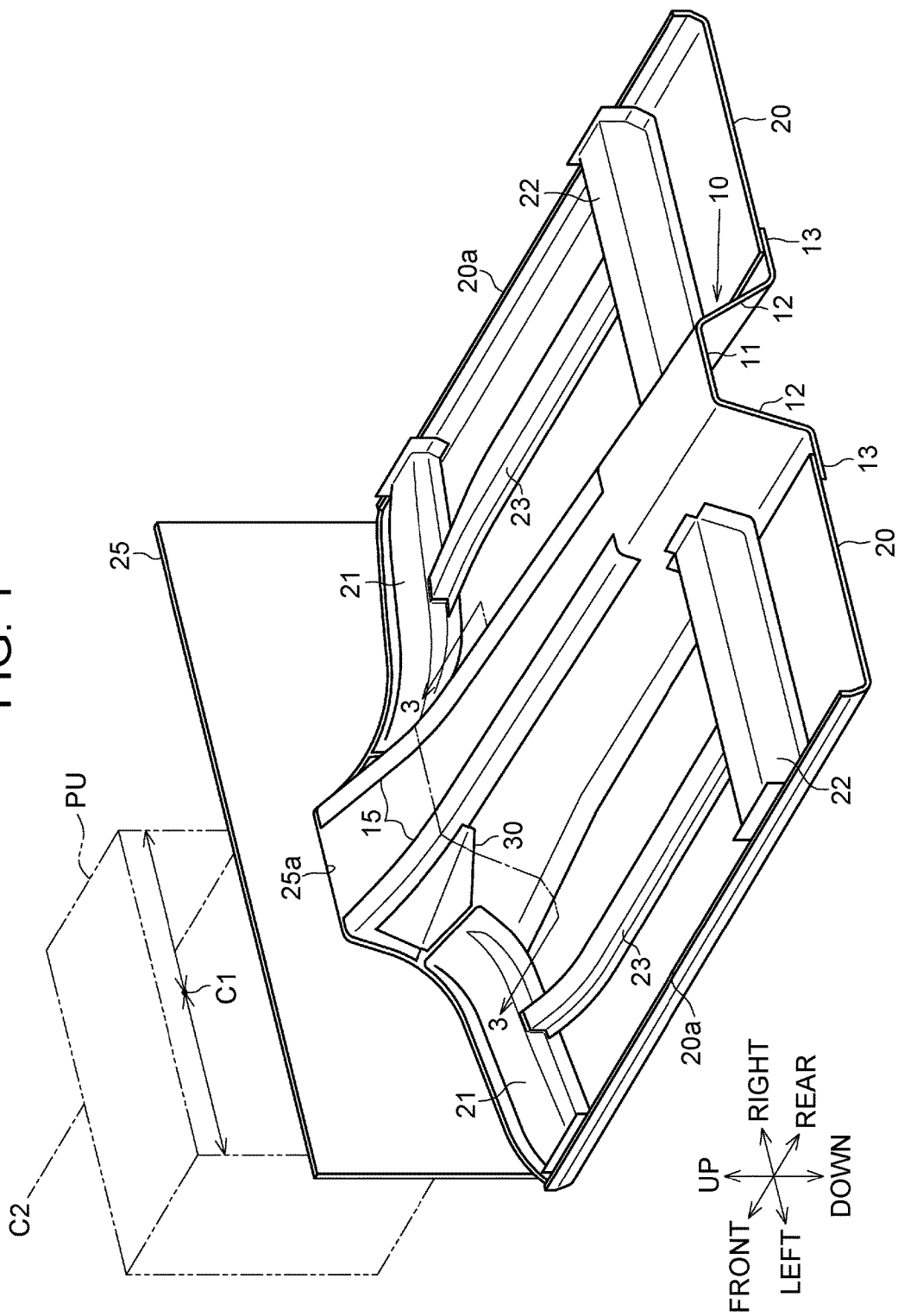
FIG. 1 is a perspective view of a vehicle floor structure.

An embodiment of the present disclosure will be described with reference to FIG. 1 to FIG. 3. Note that when right and left directions are referred to in the following description, the directions denote right and left directions when a vehicle front side is viewed from the inside of a vehicle. As shown in FIG. 1, a floor tunnel 10 of a vehicle floor structure extends in the vehicle-longitudinal direction at the center in the vehicle-width direction. The floor tunnel 10 includes a plate-like top wall 11 extending in the vehicle-longitudinal direction. Part of the top wall 11 located on the vehicle front side has a shape gradually warped upward as the top wall 11 extends toward, the front side. A pair of side walls 12 extend downward from both outer edges in the vehicle-width direction of the top wall 11. Part of each side wall 12 located on the vehicle front side has a longer extending length from the top wall 11 that is gradually longer toward the front side in accordance with the upwardly warped shape of the top wall 11. A lower edge position (level position) in the vertical direction of each side wall 12 is substantially the same across its entire vehicle-longitudinal direction. A flange 13 extends outward in the vehicle-width direction from the lower edge of each side wall 12.

In the floor tunnel 10, a tunnel reinforcement 15 is fixed to a corner ranging from each outer edge in the vehicle-width direction of the top wall 11 to an upper edge in the vehicle-upward direction of each side wall 12. As shown in FIG. 3, the tunnel reinforcement 15 is formed in a bent plate-like shape corresponding to a bent shape between the top wall 11 and the side wall 12 in the floor tunnel 10. As shown in FIG. 1, each tunnel reinforcement 15 extends in the vehicle-longitudinal direction so as to cover the front part of each corner of the floor tunnel 10 within a range of three fourths of each entire corner of the floor tunnel 10.

Floor pans 20, each formed in a generally quadrilateral plate-like shape, are fixed on both sides in the vehicle-width direction of the floor tunnel 10. Inner edges in the vehicle-width direction of respective bottom surfaces of the floor pans 20 are placed on top surfaces of respective flanges 13 of the floor tunnel 10, and both are fixed to each other by welding. Respective outer edges 20a in the vehicle-width direction of the floor pans 20 rise upward. Although not illustrated in the drawings, cylindrical lockers extending in the vehicle-longitudinal direction are located outward in the vehicle-width direction of the floor pans 20. The outer edges 20a in the vehicle-width direction of the floor pans 20 are fixed to respective surfaces on the inner side in the vehicle-width direction of the lockers. The dimension in the vehicle-longitudinal direction of each floor pan 20 is substantially the same as the dimension in the vehicle-longitudinal direction of the floor tunnel 10, and respective positions of front edges and rear edges of the floor pans 20 coincide with respective positions of a front edge and a rear edge in the vehicle-longitudinal direction of the floor tunnel.

Dash lower cross members 21 extending in the vehicle-width direction are provided on the top surface of the floor pans 20 in such a manner as to extend along the front edges of the floor pans 20. Each dash lower cross member 21 has a hat-like section in a sectional view orthogonal to its extending direction. An outer end portion in the vehicle-width direction of each dash lower cross member 21 is connected to an edge 20a of each floor pan 20. An inner end portion in the vehicle-width direction of each dash lower cross member 21 is connected to a lower part of each side wall 12 of the floor tunnel 10.

Floor cross members 22 extending in the vehicle-width direction are provided on the top surfaces of the floor pans 20 at more rearward positions in the vehicle than the dash lower cross members 21. Each floor cross member 22 has a hat-like section in a sectional view orthogonal to its extending direction. An outer end portion in the vehicle-width direction of each floor cross member 22 is connected to the edge 20a of each floor pan 20. An inner end portion in the vehicle-width direction of each floor cross member 22 is connected to each side wall 12 of the floor tunnel 10.

Side members 23 extending in the vehicle-longitudinal direction are provided on the top surfaces of the floor pans 20. Each side member 23 is located at a center position in the vehicle-width direction of each floor pan 20. Each side member 23 has a hat-like section in a sectional view orthogonal to its extending direction. Front end portions of the side members 23 are connected to the dash lower cross members 21. Rear end portions of the side members 23 are connected to the floor cross members 22.

A plate-like dash panel 25 rises toward the vehicle-upward direction from a front edge of the floor tunnel 10 and the front edges of the floor pans 20. At a center in the vehicle-width direction of a lower edge of the dash panel 25, the dash panel 25 is formed with a cutout 25a that extends upward. The cutout 25a has a shape corresponding to a shape of the front end of the floor tunnel 10, The front end of the floor tunnel 10 is fixed to an edge of the cutout 25a of the dash panel 25. That is, an inner space of the floor tunnel 10 communicates with an engine room located more frontward than the dash panel 25 via the cutout 25a.

In the engine room located more frontward than the dash panel 25 (the floor tunnel 10), a power unit PU generating driving force of the vehicle is disposed. The power unit PU is configured by an internal combustion engine, a drive motor, or an integral combination of them. The power unit PU is disposed more leftward in the vehicle-width direction than the center in the vehicle-width direction. Specifically, a center C1 of the dimension in the vehicle-width direction of the power unit PU is located more leftward than a center line C2 in the width direction of the vehicle. In FIG. 1, the shape of the power unit PU is simplified and imaginarily illustrated as a cubic body.

As shown in FIG. 1, in the side wall 12 of the floor tunnel 10, a plate-like reinforcement member 30 is fixed to the side wall 12 at a position above a location to which the dash lower cross member 21 is connected. As shown in FIG. 2, the reinforcement member 30 has a generally trapezoid shape in a plan view. The reinforcement member 30 has a longer upper edge (upper side of the trapezoid) than a lower edge (lower side of the trapezoid). As shown in FIG. 3, the reinforcement member 30 is provided with a step between an upper part and a lower part thereof, and the upper part is positioned slightly outward in the vehicle-width direction. An upper part in the vehicle-vertical direction of the reinforcement member 30 reaches a part of the side wall 12 to which the tunnel reinforcement 15 is fixed, and the upper part is placed on an outer surface of the tunnel reinforcement 15.

Figure 2:
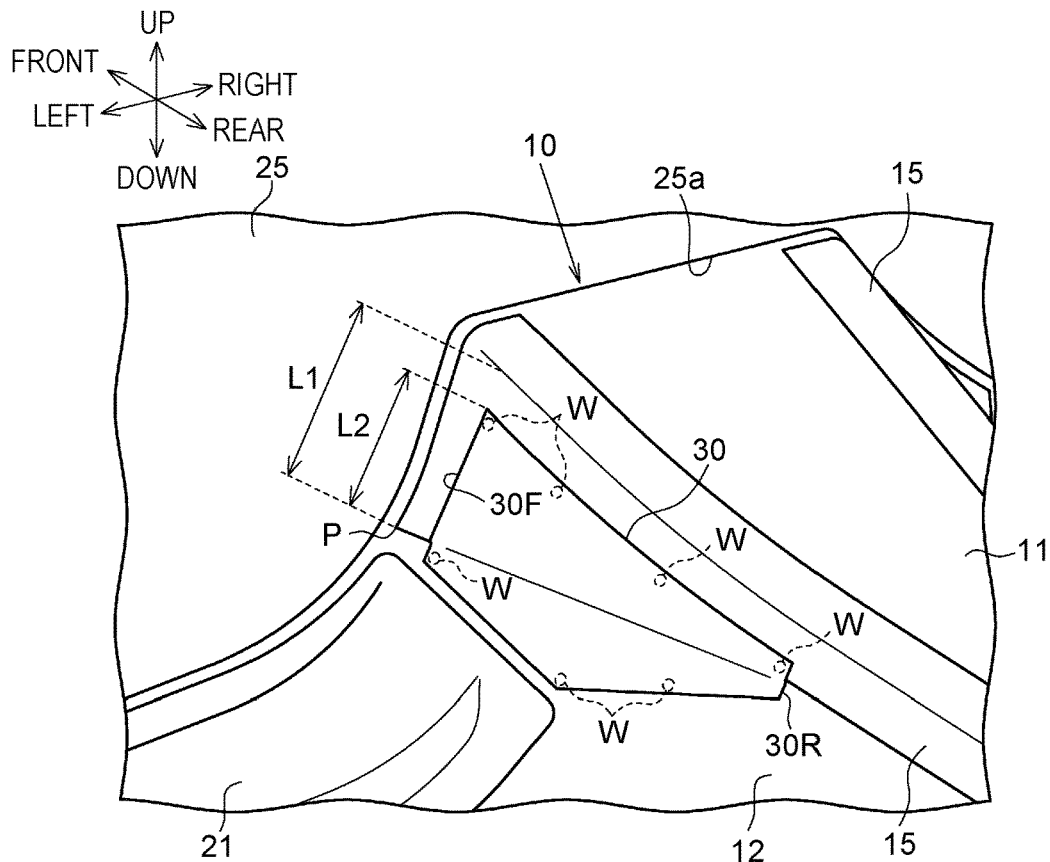
FIG. 2 is an enlarged perspective view of the vehicle floor structure.
Figure 3:
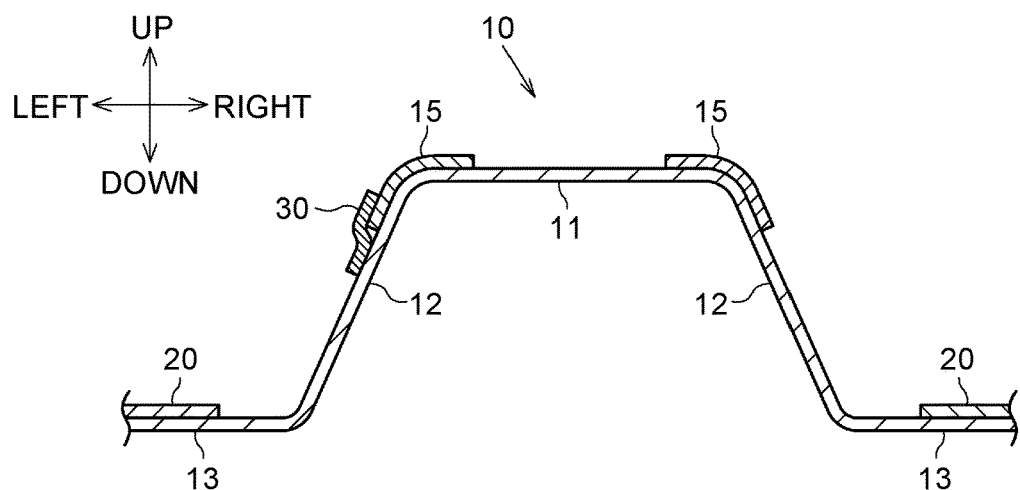
FIG. 3 is an end surface view taken along line III-III in FIG. 1.

As shown in FIG. 2, a front end portion of the reinforcement member 30 is placed on a lower half or more than a half of the funnel reinforcement 15 of the floor tunnel 10. Specifically, at the position where a front end 30F of the reinforcement member 30 is located in the vehicle-longitudinal direction, a dimension of the tunnel reinforcement 15 along the front end 30F of the reinforcement member 30 is a length L1. At the position where the front end 30F of the reinforcement member 30 is located in the vehicle-longitudinal direction, the front end portion of the reinforcement member 30 is placed on the tunnel reinforcement 15 within a range of a length L2 from the lower end of the tunnel reinforcement 15. In the embodiment, the length L2 is defined to be half or more than half of the length L1 (more specifically, around four fifths of the length L1).

A substantially rear half in the vehicle-longitudinal direction of the reinforcement member 30 has a dimension in the vehicle-vertical direction that is gradually smaller toward the rearward direction. An upper part of a rear end 30R of the reinforcement member 30 reaches the outer surface of the tunnel reinforcement 15 of the floor tunnel 10.

The reinforcement member 30 is fixed to an outer surface of the side wall 12 and the outer surface of the tunnel reinforcement 15 of the floor tunnel 10 by spot-welding. The reinforcement member 30 is welded at multiple (seven in the embodiment) welding positions W located at a circumferential edge of the reinforcement member 30. Of the welding positions W, welding positions W located in the rear end portion of the reinforcement member 30 are located in a part of the reinforcement member 30 that is placed on the tunnel reinforcement 15. Specifically, the rear end portion of the reinforcement member 30 is fixed to the outer surface of the tunnel reinforcement 15. In FIG. 2, the welding positions W of the reinforcement member 30 are imaginarily illustrated by broken lines.

In the embodiment, the reinforcement member 30 is fixed to the left side wall 12 of the pair of side walls 12 of the floor tunnel 10. On the other hand, no reinforcement member 30 is fixed to the right side wall 12. In other words, the reinforcement member 30 is provided only to the side wall 12 located on the side where the power unit PU is disposed closer in the vehicle-width direction.

Operation of the vehicle floor structure as configured above will be described. When an object collides against the vehicle from the front side and the power unit PU moves rearward, a load due to the acts on the floor tunnel 10 from the vehicle front side. In addition, part of the load from the vehicle front side is received by the dash lower cross members 21. Since the dash lower cross members 21 are connected to the side walls 12 of the floor tunnel 10, part of the load received by the dash lower cross members 21 also acts on the side walls 12 of the floor tunnel 10. That is, when the load is applied from the front side, a great stress is applied to the parts on the vehicle-front side of the side walls 12 of the floor tunnel 10. In addition, a part of each side wall 12 of the floor tunnel 10, the part being located above the dash lower cross member 21 and lower than the tunnel reinforcement 15, is easily deformed because the part is not reinforced by the tunnel reinforcement 15.

In the present embodiment, the reinforcement member 30 is fixed to the part of the outer surface of the side wall 12 of the floor tunnel 10, the part being located above the dash lower cross member 21 and lower than the tunnel reinforcement 15. Hence, the easily deformable part of the side wall 12 of the floor tunnel 10 can properly be reinforced.

Meanwhile, when a load from the vehicle front side acts on the floor tunnel 10, the front end portion of the tunnel reinforcement 15 might be separated in such a manner as to peel up from the side wall 12 of the floor tunnel 10, depending on the direction of the load, the manner of deformation of the dash panel 25, or the like. Specifically, in the present embodiment, the part located on the vehicle front side of the top wall 11 of the floor tunnel 10 is gradually warped upward toward the front side. Hence, a load from the front side is likely to act on the top wall 11 and the side walls 12 of the floor tunnel 10 as a load acting toward an obliquely-upward and rearward direction. When such a load acting toward the obliquely-upward, and rearward direction is applied, the tunnel reinforcement 15 is likely to be separated from the outer surface of the side wall 12 at a lower end P of the front edge of the tunnel reinforcement 15, as a separation starting point. If the tunnel reinforcement 15 is separated from the side wall 12, the separated part cannot exert reinforcement effect by the tunnel reinforcement 15.

To the contrary, in the present embodiment, the reinforcement member 30 is placed on the outer surface of the tunnel reinforcement 15, and is also fixed to the outer surface of the tunnel reinforcement 15. Hence, even if the tunnel reinforcement 15 is slightly separated from the lower end P at the front end thereof as the separation starting point, the separation is unlikely to be propagated more rearward than the front end 30F of the reinforcement member 30. That is, the separation of the tunnel reinforcement 15 can be suppressed at a minimum level by the reinforcement member 30. Accordingly, it is possible to securely exert the reinforcement effect expected for the tunnel reinforcement 15 of the floor tunnel 10.

In addition, in the above embodiment, the front end portion of the reinforcement member 30 is placed on the lower half or more than the lower half of the tunnel reinforcement 15. That is, a proper length in the vehicle-vertical direction of the reinforcement member 30 is secured as a dimension of the part of the reinforcement member 30 that covers the tunnel reinforcement 15. Accordingly, it is very unlikely to cause such a problem that the reinforcement member 30 peels up from the front end 30F thereof and thus it becomes difficult to suppress separation of the tunnel reinforcement by the reinforcement member 30.

In this manner, the reinforcement member 30 in the vehicle floor structure of the present embodiment can exert such effect that reinforces the easily deformable part of the side wall 12 of the floor tunnel 10, and suppresses separation of the tunnel reinforcement 15, etc. In combination with the above effect, in the present embodiment, compared with a configuration that employs no reinforcement member 30, it is possible to more properly reduce deformation of the floor tunnel 10 against a load from the vehicle front side.

In the meantime, when a load from the vehicle front side is applied, there is possibility that the load from the vehicle front side is also applied to the reinforcement member 30. When the load from the vehicle front side is applied to the reinforcement member 30, the load acts on the floor tunnel 10 via the welding positions W in the rear end portion of the refinement member 30. In the present embodiment, the welding positions W located in the rear end portion of the reinforcement member 30 are located in the part of the reinforcement member 30 placed on the tunnel reinforcement 15. Hence, when the load is applied to the reinforcement member 30 from the front side, the load can be transmitted to the tunnel reinforcement 15 via the rear end portion of the reinforcement member 30. In this manner, the load transmitted to the floor tunnel 10 via the reinforcement member 30 is allowed to act on the part of the floor tunnel 10 to which the tunnel reinforcement 15 having a relatively high strength in the floor tunnel 10 is fixed, to thereby suppress occurrence of deformation of the floor tunnel 10.

In addition, in the present embodiment, the power unit PU is disposed more leftward than the center in the vehicle-width direction. Hence, due to collision of an object from the vehicle front side, when the power unit PU moves in the vehicle-rearward direction, a great load is likely to act on the left side of the floor tunnel 10. In the present embodiment, the reinforcement member 30 is fixed to the left side wall 12 of the pair of side wall 12 of the floor tunnel 10. Accordingly, even if a great load acts on the left side of the floor tunnel 10, deformation on the left side of the floor tunnel 10 due to the load can properly be reduced.

On the other hand, no reinforcement member 30 is fixed to the right side wall 12 of the pair of side walls 12 on an opposite side to the side where the power unit PU is disposed closer. Accordingly, it is possible to minimize increase in number of components and increase in weight, or complication of the manufacturing process by employing the reinforcement member 30.

The present embodiment may be changed as follow. The present disclosure is not limited to the configuration that composes the floor tunnel 10 and the floor pans 20 by different members and fixes both of them, as described in the above embodiment; but it may be configured that the floor tunnel 10 and the floor pans 20 may be formed by press-forming a single plate material, or the like.

In the floor tunnel 10, the tunnel reinforcement 15 may have any dimension in the vehicle-longitudinal direction as far as the tunnel reinforcement 15 is fixed to at least the front end part of each corner of the floor tunnel 10. For example, the tunnel reinforcement 15 may cover each corner of the floor tunnel 10 across the entire vehicle-longitudinal direction, or may cover only a front half thereof.

The shapes and the numbers of the floor cross members 22 and the side members 23 may be appropriately changed, taking account of strength and others required as the vehicle floor structure. The sectional shape of each dash lower cross member 21 is not limited to a hat-like sectional shape. For example, it may be an arch shape (semi-circular shape) in a sectional view. The outer end portion in the vehicle-width direction of each dash lower cross member 21 may not reach the edge 20*a* of each floor pan 20 as far as the inner end portion in the vehicle-width direction of each dash lower cross member 21 is connected to each side wall 12 of the floor tunnel 10.

The plan-view shape of the reinforcement member 30 is not limited to a generally trapezoid shape. For example, it may be a square shape or a rectangular shape, or may be a polygonal shape other than quadrilateral shapes. It may be a circular shape or an oval shape. That is, the plan-view shape of the reinforcement member 30 may be any shape as far as the reinforcement member 30 has a sufficient dimension to be fixed to the side wall 12 of the floor tunnel 10, and also to be placed on the outer surface of the tunnel reinforcement 15.

The front end portion of the reinforcement member 30 may be placed on only part of the lower part of the tunnel reinforcement 15, and may be unnecessary to be placed on the lower half or more than the lower half of the tunnel reinforcement 15. Depending on the shape of the floor tunnel 10 and other surrounding structures, the tunnel reinforcement 15 and the reinforcement member 30 might be relatively difficult to be separated. In such a case, even if the front end portion of the reinforcement member 30 is placed on a very small area of the lower part of the tunnel reinforcement 15, the reinforcement member 30 is very unlikely to be separated from the runnel reinforcement 15.

The rear end portion of the reinforcement member 30 may be fixed not to the outer surface of the tunnel reinforcement 15, but to the outer surface of the side wall 12. For example, as far as the strength of each side wall 12 is secured to prevent a great deformation when a load from the vehicle-front side acts on the floor tunnel 10 via the rear end portion of the reinforcement member 30, a problem is unlikely to be caused even if the rear end portion of the reinforcement member 30 is fixed to the outer surface of the side wall 12. In addition, for example, it may be configured that the dimension in the vertical direction of the rear end portion of the reinforcement member 30 is set to be longer, and the rear end portion of the reinforcement member 30 is fixed to both the outer surface of the tunnel reinforcement 15 and the outer surface of the side wall 12 at multiple positions.

Further, the rear end portion of the reinforcement member 30 may not be fixed to the floor tunnel 18. For example, if the front end portion of the reinforcement member 30 is fixed to the floor tunnel 10 with a sufficient fixing strength, the rear end portion of the reinforcement member 30 is not always necessary to be fixed to the floor tunnel 10.

The manner of fixing the reinforcement member 30 to the floor tunnel 10 is not limited to spot-welding. There is a limitation to the number of stacked steel plates that can be fixed by spot-welding, and too many stacked steel plates might hinder a proper spot-welding. Even in such a case, for example, the reinforcement member 30 can be fixed to the floor tunnel 10 using bolts and nuts, or the reinforcement member 30 can be fixed to the floor tunnel 10 using adhesive agents. Of course, the reinforcement member 30 may be fixed to the floor tunnel 10 using fixing means other than spot-welding even when the number of stacked steel plates is small.

The power unit PU is not limited to being arranged leftward in the vehicle-width direction, and may be arranged rightward in the vehicle-width direction. In this ease, by fixing the reinforcement member 30 only to the right side wall 12 of the pair of side wall 12 of the floor tunnel 10, it is possible to exert the same effect as that of the above embodiment.

The power unit PU is may be disposed at the center in the vehicle-width direction. In this case, it is useful to fix the reinforcement members 30 to both the pair of side walls 12 of the floor tunnel 10, but the reinforcement member 30 may be fixed to either of the pair of side walls 12.

The reinforcement member 30 may be fixed to each side wall 12, regardless of the arrangement of the power unit PU.

Taking into account of other components and apparatuses disposed inside the engine room located more frontward than the dash panel 25, rigidity of the entire vehicle, and others, it may be determined to which of the side walls 12 the reinforcement member 30 is fixed, or whether or not the reinforcement member 30 is fixed to the both side walls 12.

What is claimed is:

1. A vehicle floor structure comprising:
   a floor tunnel extending in a vehicle-longitudinal direction at a center in a vehicle-width direction of a vehicle; and
   a floor pan fixed outward of the floor tunnel in the vehicle-width direction, wherein
   the floor tunnel includes a top wall having a plate-like shape, a first side wall extending downward from a first edge of the top wall in the vehicle-width direction toward the floor pan, a tunnel reinforcement covering a corner ranging from the first edge to an upper edge of the first side wall in a vehicle-upward direction, and a reinforcement member provided on the first side wall, and
   a part of the reinforcement member is placed on an outer surface of the tunnel reinforcement, and is fixed to the outer surface of the tunnel reinforcement at a position adjacent to a front end in the vehicle-longitudinal direction of the floor tunnel.

2. The vehicle floor structure according to claim 1, further comprising
   a dash lower cross member provided on upper surface of the floor pan, the dash lower cross member extending in the vehicle-width direction along a front edge of the floor pan, wherein
   an inner end portion of the dash lower cross member in the vehicle-width direction is connected to the first side wall, and
   the reinforcement member is disposed on the first side wall at a position above a position of the first side wall to which the dash lower cross member is connected.

3. The vehicle floor structure according to claim 1, wherein
   a rear end portion of the reinforcement member in the vehicle-longitudinal direction is fixed to the outer surface of the tunnel reinforcement.

4. The vehicle floor structure according to claim 1, wherein
   the floor tunnel includes a second side wall extending downward from a second edge of the top wall, the second edge being on the other side of the first edge in the vehicle width direction,
   a power unit generating driving force of the vehicle is located more frontward in the vehicle-longitudinal direction than the floor tunnel, and is disposed such that a center of the power unit is closer to the first edge of the top wall than to the second edge, and
   no reinforcement member is provided on an opposite side of the center of the floor tunnel in the vehicle-width direction from the reinforcement member.

5. The vehicle floor structure according to claim 1, wherein
   the floor tunnel includes a front region ranging from a predetermined part of the floor tunnel in the vehicle-longitudinal direction to the front end, in the front region, the top wall is located more upward as the top wall extend frontward in the vehicle-longitudinal direction, and
   the reinforcement member is fixed to the first side wall within the front region.

* * * * *

UNITED STATES PATENT AND TRADEMARK OFFICE
CERTIFICATE OF CORRECTION

PATENT NO. : 10,399,607 B2  
APPLICATION NO. : 15/873437  
DATED : September 3, 2019  
INVENTOR(S) : Yuki Sasakura Page 1 of 1

It is certified that error appears in the above-identified patent and that said Letters Patent is hereby corrected as shown below:

In the Specification

In Column 1, Line 20, delete "(JP 62498184 U)," and insert --(JP 62-198184 U),--, therefor.

In Column 1, Line 61, delete "vehicle longitudinal" and insert --vehicle-longitudinal--, therefor.

In Column 2, Line 12, delete "funnel," and insert --tunnel,--, therefor.

In Column 3, Line 43, after "toward", delete ",".

In Column 4, Line 54, delete "tunnel 10," and insert --tunnel 10.--, therefor.

In Column 5, Line 22, delete "funnel" and insert --tunnel--, therefor.

In Column 6, Line 30, after "obliquely-upward", delete ",".

In Column 8, Line 20, delete "runnel" and insert --tunnel--, therefor.

In Column 8, Line 56, delete "ease," and insert --case,--, therefor.

Signed and Sealed this  
Twenty-ninth Day of October, 2019

Andrei Iancu  
*Director of the United States Patent and Trademark Office*